United States Patent
Baginski et al.

(10) Patent No.: US 6,543,311 B1
(45) Date of Patent: Apr. 8, 2003

(54) DRIVING SYSTEM FOR INDUSTRIAL TRUCKS

(75) Inventors: Ralf Baginski, Neetze (DE); Rainer Bruns, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 09/714,398

(22) Filed: Nov. 16, 2000

(30) Foreign Application Priority Data

Nov. 17, 1999 (DE) .......................... 199 55 312

(51) Int. Cl.$^7$ ............................. F16H 47/00
(52) U.S. Cl. ........................ 74/730.1; 475/5
(58) Field of Search .............. 475/5, 72; 74/730.1

(56) References Cited

U.S. PATENT DOCUMENTS

| | | | | |
|---|---|---|---|---|
| 3,090,253 A | * | 5/1963 | Linsley et al. | |
| 3,503,281 A | * | 3/1970 | Gsching et al. | |
| 3,799,284 A | * | 3/1974 | Hender | 475/5 |
| 4,098,144 A | * | 7/1978 | Besel et al. | |
| 4,138,907 A | * | 2/1979 | Melles | |
| 5,120,282 A | * | 6/1992 | Fjallstrom | 475/5 |
| 5,343,970 A | * | 9/1994 | Severinsky | 475/5 |
| 5,558,589 A | * | 9/1996 | Schmidt | 475/5 |

FOREIGN PATENT DOCUMENTS

| | | |
|---|---|---|
| DE | 68008718 | 11/1968 |
| DE | 32 35 825 A1 | 3/1984 |
| DE | 38 15 780 C2 | 4/1990 |
| DE | 40 30 050 A1 | 3/1992 |
| DE | 195 30 566 A1 | 2/1997 |
| DE | 196 28 330 A1 | 1/1998 |
| DE | 197 47 459 A1 | 5/1999 |
| DE | 198 03 160 C1 | 5/1999 |

* cited by examiner

*Primary Examiner*—Dirk Wright
(74) *Attorney, Agent, or Firm*—Vidas, Arrett & Steinkraus

(57) ABSTRACT

A driving system for an industrial truck, comprising: a combustion engine; a two-branch gear transmission the input of which is coupled to the shaft of the combustion engine and the outputs of which are coupled to a primary shaft and a secondary shaft which are at a fixed speed ratio to each other; an adjustable transmission in the course of the secondary shaft; a gear assembly the inputs of which are coupled to the primary and secondary shafts; a change-over transmission the input of which is coupled to the output of the gear assembly and the output of which is coupled to the driven shaft of the driving system.

10 Claims, 2 Drawing Sheets

DRIVING SYSTEM FOR INDUSTRIAL TRUCKS

CROSS-REFERENCE TO RELATED APPLICATIONS

Not Applicable

STATEMENT REGARDING FEDERALLY SPONSORED RESEARCH

Not Applicable

BACKGROUND OF THE INVENTION

The invention relates to a driving system for industrial trucks.

Combustion engine driven industrial trucks require a transmission to provide the desired torque at the desired speed. It is known to use a change-speed mechanism including a clutch for this purpose. However, such a system is unacceptable for industrial trucks. Therefore, it is also known in driving systems to provide hydrodynamic transducers in combination with single-step transmissions and multi-step transmissions. This solution proves disadvantageous at slow driving speeds because efficiency is not good in this operating condition. Furthermore, a clutch function is required to independently operate the lifting function.

The disadvantages of the hydrodynamic solution are not encountered in a hydrostatic driving branch. However, what opposes the relatively high efficiency when driving at a slow speed is the bad efficiency at faster driving speeds. Another drawback is the relatively large construction expenditure due to the high hydraulic pressures up to 400 bar and the system's susceptibility to defects, particularly with regard to leakage.

Finally, in the industrial truck field, it is also known to perform the transmission of forces by means of an electric transmission. In an electric transmission, all the energy generated by the combustion engine is converted into electric energy by means of a generator. Then, this electric energy is reconverted into mechanical energy by means of an electric motor. The drive controls for electric motors are capable of adjusting any gear ratios between the generator and the electric motor. Hence, a system of this type has the advantage of being regulable particularly well. A drawback, however, are the low efficiencies due to the high losses in the controls and electric machines.

The existing solutions in driving combustion engine operated industrial trucks, as a rule, involve considerable energy losses in certain operating situations. Furthermore, the existing systems are incapable of returning energy in braking. Furthermore, emissionless operation is impossible, which nearly rules out the use of such industrial trucks in closed rooms. Another disadvantage of the former driving systems lies in the fact that the components of the systems require to be designed for peak loads. The mean load acting on the components, however, clearly is below such values. Thus, a large construction expenditure is incurred that is not needed for the mean.

DE 198 03 160 has made known a two-branch driving system for automobiles which is intended to better meet the requirements to power-driven vehicles in a stop-and-go operation in conurbations. The known system is a so-called hybrid drive with a first electric machine disposed on a driving shaft of the hybrid drive and a second electric machine the two of which are always operable as a generator and an electric motor and which are coupled to each other and to the combustion engine via a two-branch gear transmission. The second electric machine is positioned on a shaft with which a rotary brake is associated which is controllable in dependence on the driving condition of the power-driven vehicle and by which the respective shaft can be located. It is by means of such a driving system that a more favourable efficiency behaviour of power-driven vehicles and a long service life of the drive are intended to be ensured.

DE 197 47 459 has made known a two-branch driving system for tractors and agricultural machinery which has a mechanical drive and an adjustable hydrostatic transmission. This driving system is intended to increase efficiency via the mechanical branch. In addition, a driving system of this type may obtain a higher speed as compared to simple hydrostatic driving systems. The known driving system, as a rule, does not need the same forward movement and reverse movement speed as is the case in industrial trucks. The earlier described hydrid driving system does not make it possible either to reverse at a maximum speed.

It is the object of the invention to provide a driving system for industrial trucks that enables a large range of speed adjustability at a uniformly good efficiency and does not limit the manoeuvrability of the vehicle. In addition, one embodiment is also intended to make possible emissionless operation in closed rooms at least temporarily.

BRIEF SUMMARY OF THE INVENTION

In the inventive driving system for industrial trucks, a two-branch system is provided wherein the primary branch provides a mechanical no-clutch connection between the combustion engine and the driven shaft whereas an adjustable transmission is disposed with no clutch in a secondary branch. The primary and secondary shafts are at a fixed speed ratio to each other with the gear ratio of the two-branch gear transmission being 1, for example. In a gear assembly, the speed of the primary and secondary shafts are summed up. To realize a zero number of revolutions on the driven shaft (with the vehicle stopped) the primary branch and the secondary branch, as a rule, need to have a counter-rotation sense. Therefore, a reversal of the sense of rotation requires to occur in the primary or secondary branch. This one may be effected either in the two-branch gear transmission, the adjustable transmission or the gear assembly. The output shaft of the gear assembly is coupled to a change-over transmission in order to selectively reverse the sense of rotation of the driven shaft of the driving system and, hence, the direction of travel.

The adjustable transmission can be designed differently and be, for example, an adjustable electric, hydrostatic, hydrodynamic, pneumatic or mechanical transmission. As adjustable mechanical transmissions, various infinitely variable transmissions are imaginable such as a V-belt driven variable transmission, a flat-belt driven variable transmission, a steel thrust belt driven variable transmission, a steel thrust chain variable transmission or a friction gear variable transmission. The gear ratio of the adjustable transmission may be infinitely varied when in operation. Since the gear assembly sums up the speeds of the shafts the speed of the driving system's driven shaft may also be varied from zero to the maximum speed. For the rest, the gear assembly may be put in the place of the two-branch gear transmission, and vice versa, in which case, however, no adjustable mechanical transmission can be provided. Various variants are imaginable to realize the gear assembly. In an aspect, it may be a planetary mechanism or a differential mechanism.

In another aspect of the invention, an accumulator may be associated with the adjustable transmission. In a hydrostatic transmission, a pressure accumulator will have to be provided. In an electric transmission, this accumulator is a battery. If an accumulator is used the vehicle may be operated without any exhaust gases in order to enable it, for example, to be driven in closed rooms. Moreover, energy recovery may be possible during braking.

If the vehicle has stopped and the combustion engine has been started this one will rotate at an idle speed. At a gear ratio of 1, the primary shaft and the secondary shaft will rotate at the same speed, but in opposite senses. If the adjustable transmission is adjusted so as to rotate the driven shaft at the same speed as the primary shaft there will be no speed on the driven shaft of the driving system. The vehicle will stand at idle. To make it start up the gear ratio is changed.

The inventive driving system involves a series of advantages. The speed variation range will result to be larger than that of single-branch driving systems. A high efficiency will be obtained because some part of the power is transmitted in a directly mechanical way. The adjustable transmission which is relatively expensive need not be designed for a maximum power. Such a driving system has several advantages:

Transmissions having a variable gear ratio generally are of an efficiency which is lower than the one of those having a constant gear ratio. Therefore, the power loss decreases and the overall efficiency of the drive increases.

Because of the lower demands to power, adjustable drives may be used the capacity of which would not be sufficient otherwise, e.g. V-belt driven variable transmissions. In addition, the adjustable drive may be dimensioned smaller.

The gear ratio between the combustion engine and the output shaft of the driving system may be made to be zero. This enables the vehicle to be kept at stoppage while the combustion engine is running with the flux of power not being interrupted by an engaging and disengaging clutch. In addition, the spread of the gear ratio takes on any magnitude desired in this manner. (The spread referred to here is known to be the relationship between the largest and the smallest gear ratio of an adjustable transmission).

However, a driving system possesses the two first advantages only if a change-over transmission is provided for the reversal of the sense of rotation when a change is made between the forward and backward travels. It is true that the reversal of the sense of rotation could even be realized without any change-over transmission, but only by varying the gear ratio of the adjustable transmission. Without any change-over transmission, the maximum power to be transmitted by the adjustable transmission at a backward travel at a maximum speed would be larger than the output power of the driving system's driving shaft.

If an accumulator is provided the combustion engine may be designed to be smaller for the permanent output power produced. Furthermore, an accumulator permits to drive with no exhaust gas. Energy may be recovered during braking. This reduces the consumption of energy and the requirements to the thermal load-carrying capacity of the operating brakes will be lower.

BRIEF DESCRIPTION OF THE SEVERAL VIEWS OF THE DRAWINGS

The invention will now be explained in detail with reference to embodiments shown in the drawings.

DETAILED DESCRIPTION OF THE INVENTION

Figure 1:
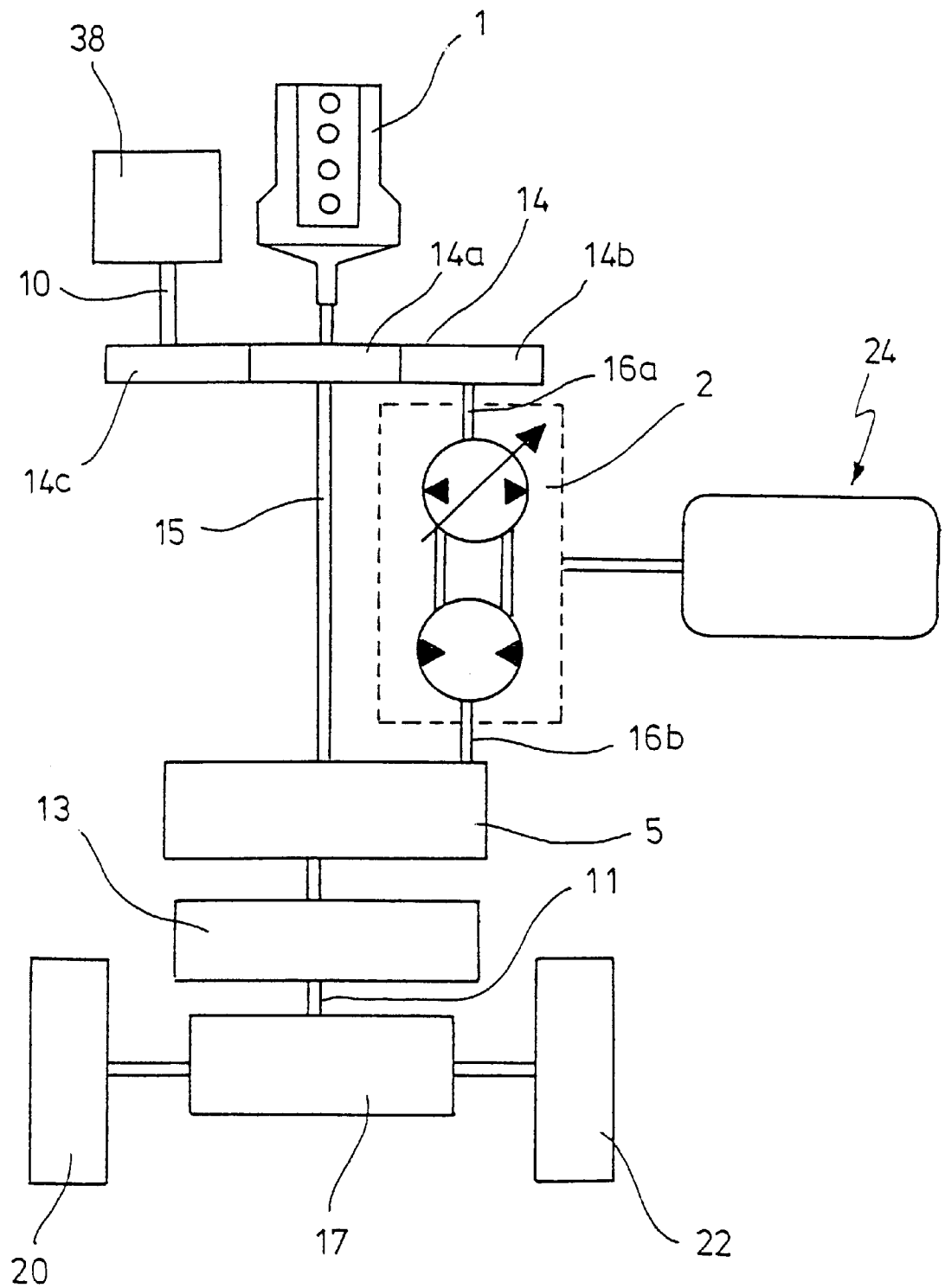
FIG. 1 shows a connection diagram of a first embodiment of a driving system according to the invention.

Coupled to the shaft of an internal combustion engine 1 in FIG. 1 is a two-branch gear transmission 14 which has two intermeshing gears 14a, 14b the gear ratio of which, for example, is 1. Coupled to the first gear 14a is a primary shaft 15 and coupled to the second gear 14b is a secondary shaft 16a which defines the input shaft to an adjustable hydrostatic transmission 2. Its output shaft 16b is the input shaft of a gear assembly 5 with the primary shaft 15 at the same time being a further input shaft of the gear assembly 5. The gear assembly 5, for example, is a planetary mechanism. Coupled to the output shaft of the gear assembly 5 is a change-over transmission 13 the output of which is coupled to a differential mechanism 17 which acts onto the wheels 20, 22 of an industrial truck (not shown in detail). The change-over transmission 13, e.g. a common gear transmission, requires to be shiftable when under a load at stoppage. Synchronizing the speeds of the input and output shafts is unnecessary. It is known to use such change-over transmissions, for example, in combustion engine driven fork-lift trucks including hydrodynamic transducers.

Associated with the adjustable transmission 2 is a pressure accumulator 24 which is capable of accumulating some part of the energy generated by the pump of the transmission 2 with a view to releasing it later on, e.g. for driving the wheels 20, 22 independently of the combustion engine 1.

A third gear 14c is coupled to a fluid power pump 38 via a shaft 10. For example, it feeds the hydraulic unit for the lifting device and for other functions that are operated hydraulically.

If the combustion engine rotates at an idle speed the shafts 15, 16a will rotate, for example, at equal speeds, but in opposite senses. If the transmission 2 is adjusted so that the shaft 16 and the shaft 16b rotate at equal speeds, but in different senses, no speed will result on the driven shaft 11 of the driving system. Thus, the vehicle stands at idle. To drive it, the gear ratio is changed on the adjustable transmission in order to obtain the desired speed. To this effect, an operator actuates a desired-value transmitter (not shown), which converts the desired-value signal into a gear ratio signal. Also, a governing device (not shown) may be provided to provide a speed control according to the desired-value signal. A governor controls the adjustable hydrostatic transmission 2 and the change-over transmission 13. A sensor system (not shown) detects the speeds of the shafts 15, 16b, and that of the driven shaft for a control of the drive according to a desired-value transmitter (not shown) actuated by the vehicle operator. The direction of travel is determined, in the driving system, by the shift position of the change-over transmission 13. By actuating an appropriate operating device (e.g. a switch for the direction of travel or a dual pedal), the vehicle driver informs the governing device in which direction he wishes to drive. If the vehicle is at stoppage at this point the change-over transmission 13 either is shifted into the position belonging to the desired direction of travel immediately after the operating device is actuated. However, if the vehicle runs in the opposite direction it will be braked initially until its speed is zero. During this short-time passage of the driving speed through zero, the change-over transmission 13 is shifted. Immediately afterwards, the vehicle will be accelerated again in the new direction of travel.

Hence, shifting the change-over transmission 13 never is done directly by the driver, but always by the governing device in dependence on the actual state of travel and the position of the above-mentioned operating device. This ensures that the change-over transmission 13 is shifted only if the input and output shafts are at stoppage or at least at an approximate stoppage. (The designations "input and output shafts" refer to the change-over transmission rather than to the whole driving system here). This permits to dispense with a mechanism for synchronizing the numbers of revolutions and, moreover, no shocks will occur and no wear will result owing to the shifting operation.

However, the change-over transmission 13 has to be shiftable when under a load, i.e. under the action of a torque because there is definitely a provision that a fork-lift truck, for example, while being on an oblique ramp such as a drive-up ramp, be kept stopped by the driving system. Even in this peculiar condition, the transmission needs to be capable of being shifted according to the direction of travel which is desired.

If a change-over transmission is used in which the two senses of rotation of the output shaft may be turned on simultaneously the transmission might get blocked. Thus, the change-over transmission 13 also performs the function of a parking brake. Then, a separate parking brake may be dispensed with.

The system consists of two speed sensors 70 (shown in FIG. 1) which provide signals to a control device/governor 72 (shown in FIG. 1). The control device is connected to the change-over transmission 13 and the gear assembly 5.

Figure 2:
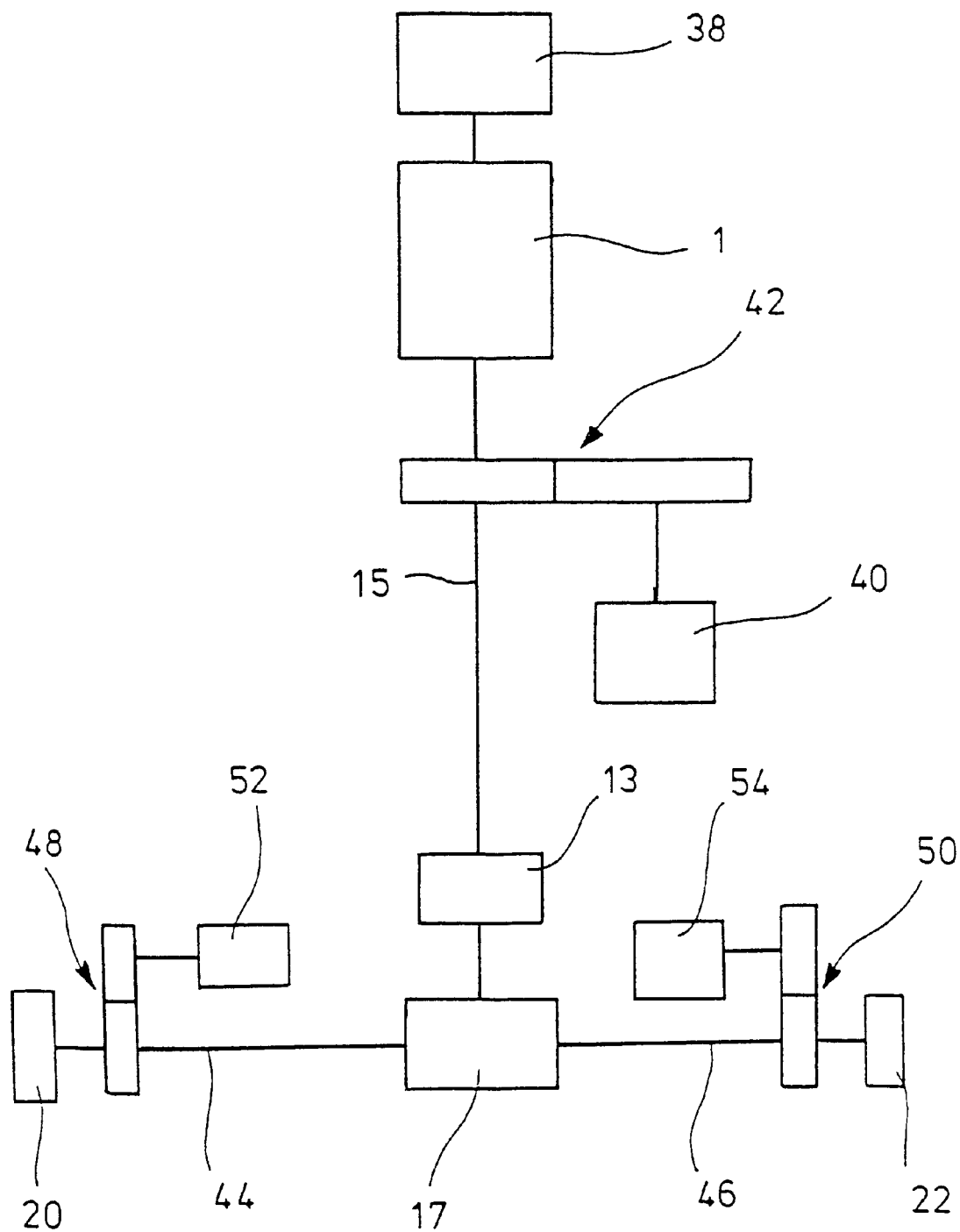
FIG. 2 shows a connection diagram of a second embodiment of a driving system according to the invention.
Figure 1:
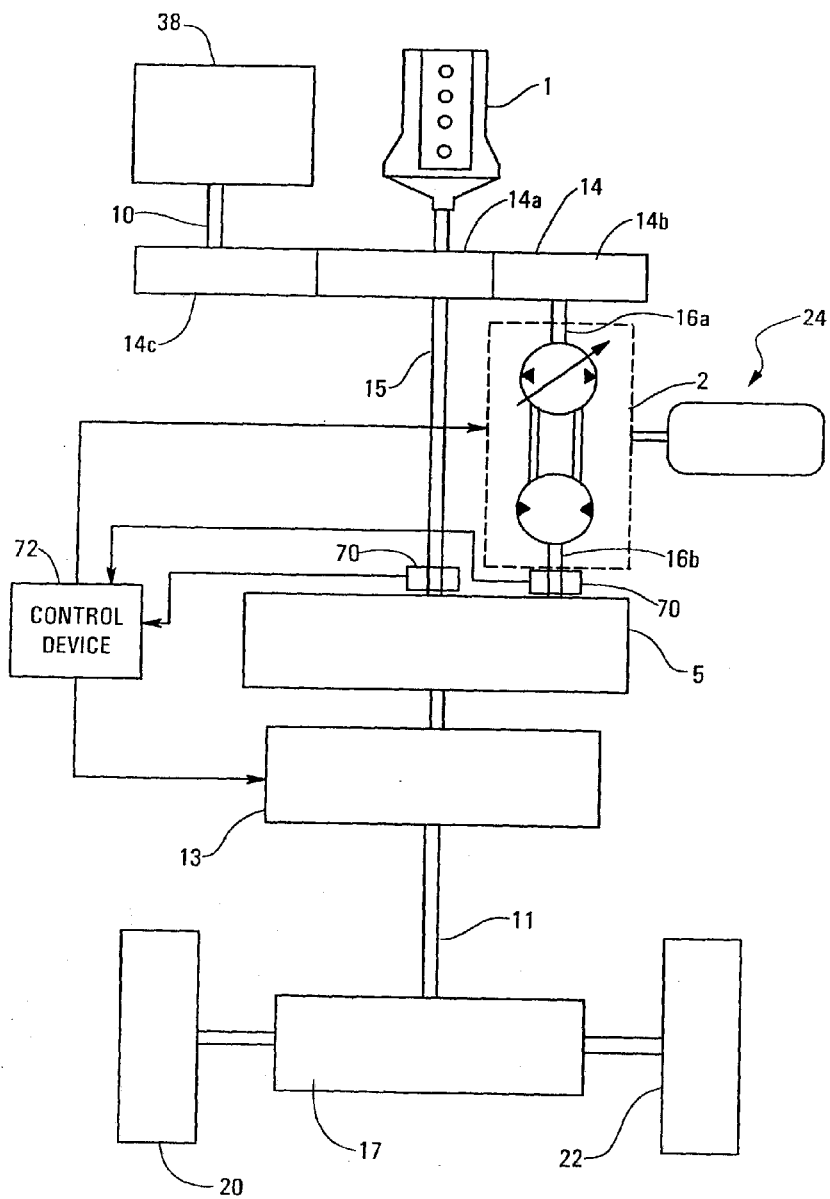

The embodiment of FIG. 2 differs from that of FIG. 1 by the fact that the adjustable transmission of FIG. 1 is comprised of several electric motors. A first electric motor 40 is coupled to the shaft 15 of the engine or the internal combustion engine 1 via a transmission 42 (with the embodiment shown in FIG. 2 using the same reference numbers as the one of FIG. 1 as far as identical components are concerned). Each driving shaft 44 and 46 for the wheel 20 and the wheel 22, respectively, of the industrial truck (not shown) is coupled to a transmission 48 and 50, respectively, the input of which is in an effective communication with an electric motor 52 and 54, respectively. Even at this point, the large range of speed adjustability desired is realized at a high efficiency.

In the embodiment of FIG. 2, a fluid power pump 38 for the supply of hydraulic users is directly seated on the shaft of the combustion engine 1. For the rest, however, the drive of the fluid power pump is unproblematic.

The mode of action of the driving system according to the embodiment of FIG. 2, for the rest, performs in a way comparable to that of the embodiment of FIG. 1 so that it appears unnecessary to explain it once more in detail.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

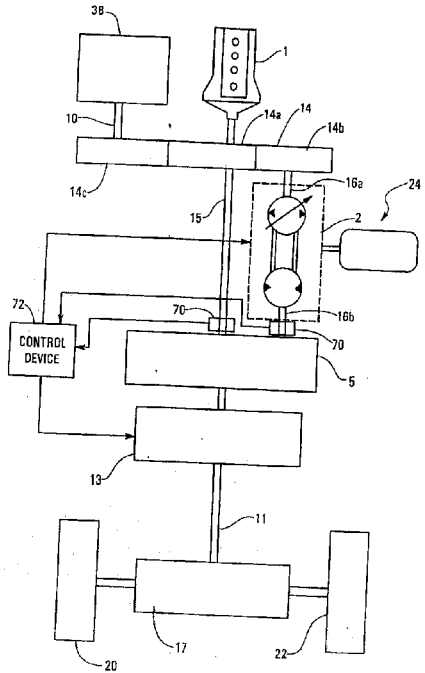

What is claimed is:

1. A driving system for an industrial truck, comprising:
   a combustion engine (1);
   a two-branch ear transmission (14) having an input coupled with the shaft of the combustion engine (1) and having outputs coupled to a main shaft (15) and a secondary shaft (16*a*), the shafts being at a fixed speed ratio relative to each other;
   a coupling-free adjustable electrical or mechanical transmission (2) in the secondary shaft, having a speed ratio continuously adjustable;
   a collecting transmission (5) having inputs coupled to the main shaft and the secondary shaft such that the speed of these shafts are summed and the speed of the output shaft can be changed between zero and a maximum speed;
   a change-over transmission (13) to change the rotational sense upon the change from forward to rearward driving and vice versa, the change-over transmission being designed such that it can be shifted under load; and
   the connection of the combustion engine with the wheels to be driven is free of any clutches.

2. The driving system according to claim 1, characterized in that an accumulator (24) is associated with the adjustable transmission (2).

3. The driving system according to claim 1, characterized in that the change-over transmission (13) is coupled with the output of the collection transmission.

4. The driving system according to claim 1, characterized in that an output shaft (10) of the two-branch gear transmission (14) drives a fluid power pump (38) for the supply of hydraulic functions in the vehicle.

5. The driving system according claim 1, characterized in that a control device is provided which controls the, adjustable transmission (2) and/or the change-over transmission (13) and a sensor system is provided which detects the speeds of the main and secondary shafts (15, 16*b*), an operating element presets a desired value and, a signal for the direction of travel, and the control device shifts the gear ratio of the adjustable transmission in accordance with the difference of the desired value and the actual value of the speed.

6. The driving system according to claim 5, characterized in that the change-over transmission (13) is adapted to be shifted under load and is shifted by the control means when the input and output shafts of the change-over transmission are approximately at standstill.

7. The driving system according to claim 1, characterized in that the two-branch gear transmission and the collection transmission are changed with respect to their position.

8. A driving system for an industrial truck, comprising:
   a combustion engine (1)
   a two-branch gear transmission (42) having an input coupled with a shaft of the combustion engine and having outputs coupled with the main shaft (15) and a secondary shaft which are at a fixed speed ratio relative to each other;
   a coupling-free adjustable transmission providing a continuously adjustable speed, the coupling free adjustable transmission including a first electric motor(40) coupled with the secondary shaft and a second or third electric motor (52, 54), each coupled to an input of a collecting transmission (48, 50) such that the speed of these shafts are summed and the speed of the output for each driven wheel (20, 22) can be changed between zero and a maximum;

a change-over transmission (13) for changing the rotational direction upon a change between forward and rearward driving;

a battery associated with the electric motors (50, 52, 54), and a differential gear transmission (17) coupled to the main shaft (15) and having outputs (44, 46) coupled with a further input of the associated collecting transmission (52, 50).

9. The driving system according to claim 8, characterized in that the two-branch gear transmission and the collection transmission are changed with respect to their position.

10. The driving system of claim 8, characterized in that the shaft of the combustion engine (1) is coupled with a fluid power pump (38).

* * * * *

UNITED STATES PATENT AND TRADEMARK OFFICE
CERTIFICATE OF CORRECTION

PATENT NO.   : 6,543,311 B1
DATED        : April 8, 2003
INVENTOR(S)  : Ralf Baginski and Rainer Bruns It is certified that error appears in the above-identified patent and that said Letters Patent is hereby corrected as shown below:

Delete the title page and substitute with the attached title page.

Delete Drawing Sheet 1, consisting of Fig. 1 and substitute with the attached Sheet 1 consisting of Fig. 1.

Signed and Sealed this

Eleventh Day of November, 2003

JAMES E. ROGAN
*Director of the United States Patent and Trademark Office*

(12) United States Patent
Baginski et al.

(10) Patent No.: US 6,543,311 B1
(45) Date of Patent: Apr. 8, 2003

(54) DRIVING SYSTEM FOR INDUSTRIAL TRUCKS

(75) Inventors: Ralf Baginski, Neetze (DE); Rainer Bruns, Hamburg (DE)

(73) Assignee: Jungheinrich Aktiengesellschaft, Hamburg (DE)

(*) Notice: Subject to any disclaimer, the term of this patent is extended or adjusted under 35 U.S.C. 154(b) by 0 days.

(21) Appl. No.: 09/714,398

(22) Filed: Nov. 16, 2000

(30) Foreign Application Priority Data

Nov. 17, 1999 (DE) .......................................... 199 55 312

(51) Int. Cl.$^7$ ............................................... F16H 47/00
(52) U.S. Cl. ............................................ 74/730.1; 475/5
(58) Field of Search ........................ 475/5, 72; 74/730.1

(56) References Cited

U.S. PATENT DOCUMENTS

| | | | | |
|---|---|---|---|---|
| 3,090,253 A | * | 5/1963 | Linsley et al. | |
| 3,503,281 A | * | 3/1970 | Gsching et al. | |
| 3,799,284 A | * | 3/1974 | Hender | 475/5 |
| 4,098,144 A | * | 7/1978 | Besel et al. | |
| 4,138,907 A | * | 2/1979 | Melles | |
| 5,120,282 A | * | 6/1992 | Fjallstrom | 475/5 |
| 5,343,970 A | * | 9/1994 | Severinsky | 475/5 |
| 5,558,589 A | * | 9/1996 | Schmidt | 475/5 |

FOREIGN PATENT DOCUMENTS

| | | |
|---|---|---|
| DE | 68008718 | 11/1968 |
| DE | 32 35 825 A1 | 3/1984 |
| DE | 38 15 780 C2 | 4/1990 |
| DE | 40 30 050 A1 | 3/1992 |
| DE | 195 30 566 A1 | 2/1997 |
| DE | 196 28 330 A1 | 1/1998 |
| DE | 197 47 459 A1 | 5/1999 |
| DE | 198 03 160 C1 | 5/1999 |

* cited by examiner

*Primary Examiner*—Dirk Wright
(74) *Attorney, Agent, or Firm*—Vidas, Arrett & Steinkraus

(57) ABSTRACT

A driving system for an industrial truck, comprising: a combustion engine; a two-branch gear transmission the input of which is coupled to the shaft of the combustion engine and the outputs of which are coupled to a primary shaft and a secondary shaft which are at a fixed speed ratio to each other; an adjustable transmission in the course of the secondary shaft; a gear assembly the inputs of which are coupled to the primary and secondary shafts; a change-over transmission the input of which is coupled to the output of the gear assembly and the output of which is coupled to the driven shaft of the driving system.

10 Claims, 2 Drawing Sheets